US011870197B2

(12) United States Patent
Radtke et al.

(10) Patent No.: US 11,870,197 B2
(45) Date of Patent: Jan. 9, 2024

(54) SYSTEMS AND METHODS FOR DETERMINING A STATUS OF AN ACTION PERFORMED BY A POWER TOOL

(71) Applicant: MILWAUKEE ELECTRIC TOOL CORPORATION, Brookfield, WI (US)

(72) Inventors: Timothy J. Radtke, New Berlin, WI (US); Luke J. Skinner, West Bend, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 100 days.

(21) Appl. No.: 17/235,151

(22) Filed: Apr. 20, 2021

(65) Prior Publication Data

US 2021/0328399 A1 Oct. 21, 2021

Related U.S. Application Data

(60) Provisional application No. 63/012,453, filed on Apr. 20, 2020.

(51) Int. Cl.

| | |
|---|---|
| ***H01R 43/042*** | (2006.01) |
| ***B25F 5/02*** | (2006.01) |
| *B25F 5/00* | (2006.01) |

(52) U.S. Cl.

CPC ........... *H01R 43/0428* (2013.01); *B25F 5/02* (2013.01); *B25F 5/005* (2013.01)

(58) Field of Classification Search

CPC ... B25F 5/02; B25F 5/005; B25F 5/00; H01R 43/0486; H01R 4/183; Y10T 29/532; Y10T 29/5327

See application file for complete search history.

(56) References Cited

U.S. PATENT DOCUMENTS

| | | | | |
|---|---|---|---|---|
| 10,427,201 | B2 * | 10/2019 | Bungter | B25B 27/10 |
| 10,646,987 | B2 * | 5/2020 | Barezzani | B25B 27/026 |
| 10,784,641 | B2 * | 9/2020 | Couch | H01R 4/183 |
| 11,213,875 | B2 * | 1/2022 | Ruch | B25B 27/10 |

(Continued)

FOREIGN PATENT DOCUMENTS

JP 2019206073 A 12/2019

OTHER PUBLICATIONS

International Search Report and Written Opinion for Application No. PCT/US2021/028110 dated Aug. 4, 2021 (10 pages).

*Primary Examiner* — Donghai D Nguyen

(74) *Attorney, Agent, or Firm* — Michael Best & Friedrich LLP

(57) ABSTRACT

Systems and methods for determining a status of an action performed by a power tool. For example, the power tool includes a power tool housing, an accessory, and an electronic processor. The housing includes a recess and an input device. The accessory is configured to be received by the recess. The accessory includes an identifier. The electronic processor is connected to the input device. The electronic processor is configured to receive a first signal from the identifier, determine an accessory type based on the first signal, receive a second signal from the input device, initiate an action based on the second signal, determine an outer diameter of the workpiece, calculate a force applied by the power tool, determine a distance traveled by the accessory during the action, and determine a status of the action based on the force applied to the workpiece and the distance.

9 Claims, 11 Drawing Sheets

(56) References Cited

U.S. PATENT DOCUMENTS

| | | | |
|---|---|---|---|
| 2008/0276678 | A1 | 11/2008 | Pacaud et al. |
| 2016/0016222 | A1 | 1/2016 | Bungter et al. |
| 2017/0028536 | A1 | 2/2017 | Lefavour et al. |
| 2018/0161969 | A1 | 6/2018 | Rosani |
| 2019/0237926 | A1 | 8/2019 | Couch et al. |

* cited by examiner

SYSTEMS AND METHODS FOR DETERMINING A STATUS OF AN ACTION PERFORMED BY A POWER TOOL

RELATED APPLICATIONS

This application claims the benefit of U.S. Provisional Patent Application No. 63/012,453, filed Apr. 20, 2020, the entire content of which is hereby incorporated by reference.

FIELD

The present invention relates to determining a status of an action performed by a power tool, such as a crimping action.

SUMMARY

Systems described herein include a power tool housing, an accessory, and an electronic processor. The housing includes a recess and an input device. The accessory is configured to be received by the recess. The accessory includes an identifier. The electronic processor is connected to the input device. The electronic processor is configured to receive a first signal from the identifier, determine an accessory type based on the first signal, receive a second signal from the input device indicating a request to perform an action on a workpiece, initiate the action based on the second signal, determine an outer diameter of the workpiece, calculate a force applied by the power tool to the workpiece, determine a distance traveled by the accessory during the action, and determine a status of the action based on the force applied to the workpiece and the distance traveled by the accessory.

Methods described herein for determining a status of an action performed by a power tool include identifying a type of accessory received by the power tool, detecting an initiation signal from an input device associated with the power tool, determining a pressure applied to a workpiece by the accessory during the action, determining a distance traveled by the accessory during the action, and determining a status of the action based on the pressure and the distance.

Methods described herein for determining a status of a crimping action performed by a power tool include determining a type of workpiece received by the power tool, initiating the crimping action performed by the power tool, determining the integral of the force over distance applied by the power tool during the crimping action, determining whether the crimping action is complete, and determining a status of the crimping action based on the integral of the force applied by the power tool.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiments, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other features and aspects will become apparent by consideration of the following detailed description and accompanying drawings.

DETAILED DESCRIPTION

Figure 1A:
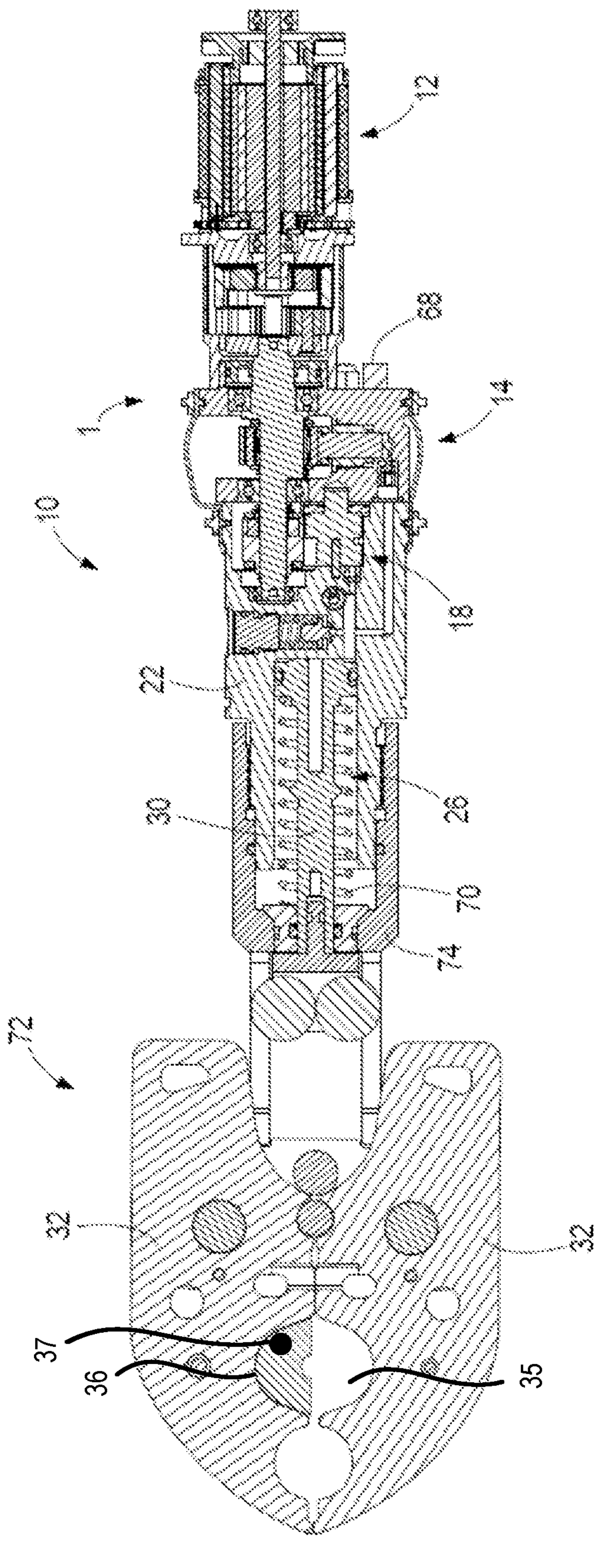
FIGS. 1A-1B are cross-sectional views of a power tool in accordance with an embodiment described herein.

FIG. 1A illustrates an embodiment of a power tool 10, such as a crimper. The crimper includes a housing 11 (see FIG. 6) which has been removed for illustrative purposes. The power tool 10 includes an electric motor 12, and a pump 14 driven by the motor 12. In some embodiments, the power tool 10 also includes a cylinder housing 22 defining a piston cylinder 26, and an extensible piston 30 disposed within the piston cylinder 26. The power tool 10 also includes electronic control and monitoring circuitry for controlling and/or monitoring various functions of the power tool 10. In some embodiments, the pump 14 causes the piston 30 to extend from the cylinder housing 22 and actuate a pair of jaws 32 for crimping a workpiece, such as a connector. The jaws 32 are a part of a crimper head 72, which also includes a clevis 74 for attaching the head 72 to a body 1 (e.g., a housing) of the power tool 10, which otherwise includes the motor 12, pump 14, cylinder housing 22, and piston 30.

The crimper head 72 may include different types of dies (for example, die 36 in FIG. 1A) depending on the size, shape, and material of the workpiece. The dies are received, for example, by a recess 35 included within the crimper head 72 or the cylinder housing 22. The dies can be used for electrical applications (e.g., wire and couplings) or plumbing applications (e.g., pipe and couplings). The size of the dies depend on the size of a wire, pipe, coupling, etc., to be crimped. In some embodiments, die sizes include #8, #6 , #4 , #2 , #1, 1/0, 2/0, 3/0, 4/0, 250 MCM, 300 MCM, 350 MCM, 400 MCM, 500 MCM, 600 MCM, 750 MCM, and 1000 MCM. The shape formed by the die can be circular or another shape. In some embodiments, the dies are configured to crimp various malleable materials and metals, such as copper (Cu) and aluminum (Al). Additionally, the dies can be removable to allow the power tool 10 to crimp different workpieces. In some embodiments, the power tool 10 may be a dieless crimper.

Figure 2:
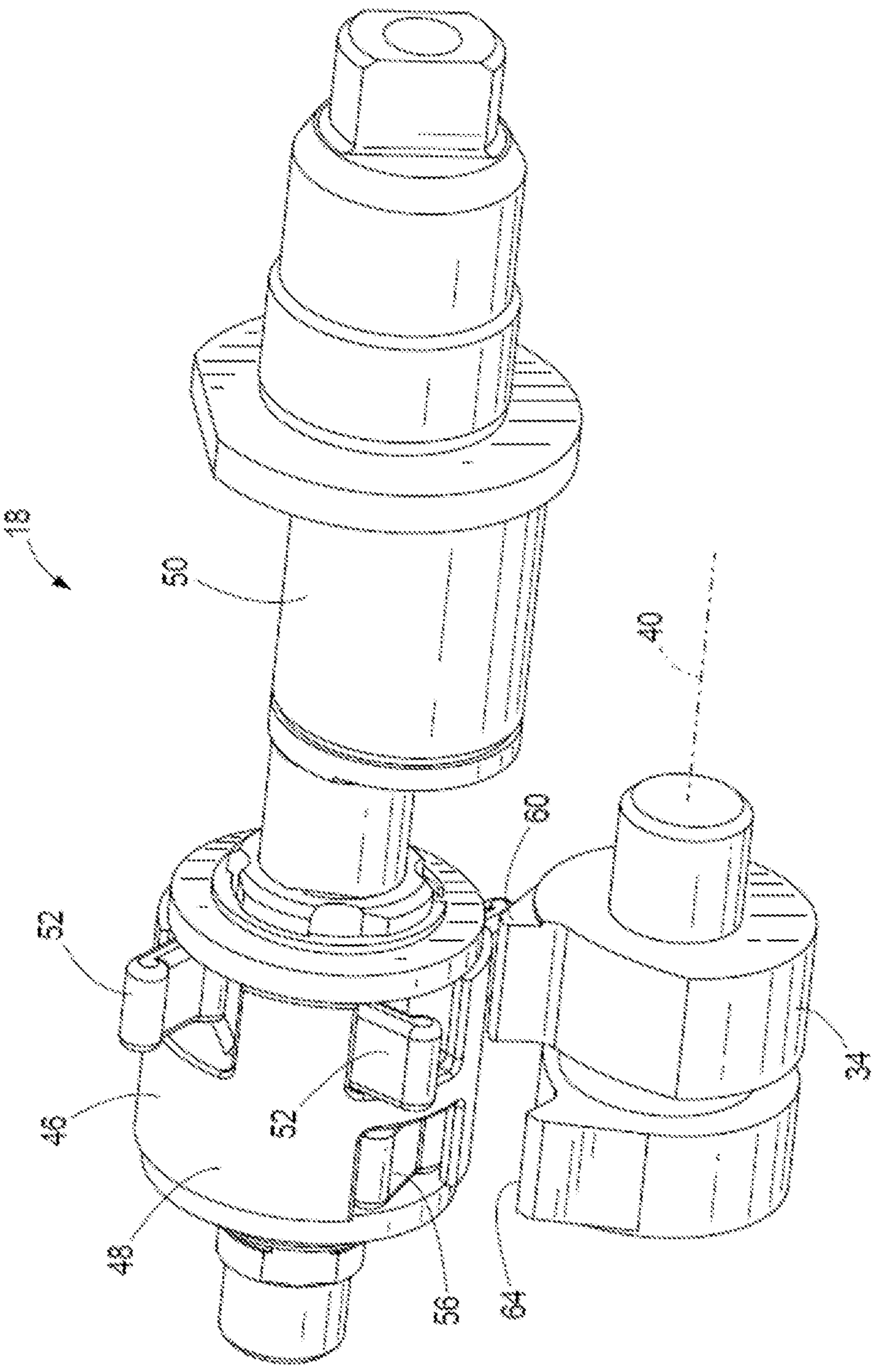
FIG. 2 is a perspective view of a rotary return valve of the power tool of FIG. 1A.

With reference to FIG. 2, the assembly 18 also includes a valve actuator 46 driven by an input shaft 50 of the pump 14 for selectively closing the return valve 34 (e.g., when the return port 38 is misaligned with the return passageway 42) and opening the return valve 34 (e.g., when the return port 38 is aligned with the return passageway 42). The valve actuator 46 includes a generally cylindrical body 48 that accommodates a first set of pawls 52 and a second set of pawls 56. In other embodiments, the sets of pawls 52, 56 may include any other number of pawls.

The pawls 52, 56 are pivotally coupled to the body 48 and extend and retract from the body 48 in response to rotation of the input shaft 50. The pawls 52 extend when the input shaft 50 is driven in a clockwise direction, and the pawls 52 retract when the input shaft 50 is driven in a counter-clockwise direction. Conversely, the pawls 56 extend when the input shaft 50 is driven in the counter-clockwise direction, and retract when the input shaft 50 is driven in the clockwise direction. The pawls 52, 56 are selectively engageable with corresponding first and second radial projections 60, 64 on the return valve 34 to open and close the valve 34.

Figure 3:
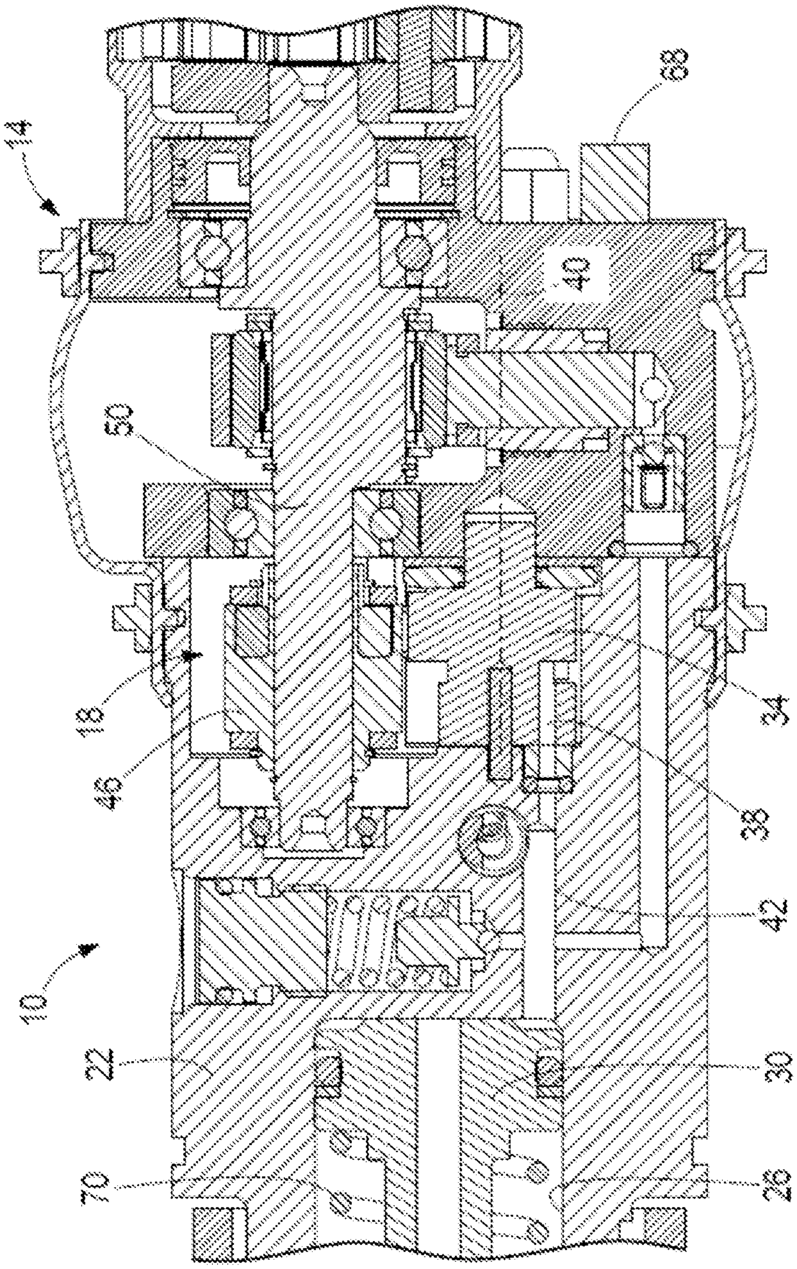
FIG. 3 is a portion of the power tool of FIG. 1A, illustrating the rotary return valve in an open position.

Prior to initiating a crimping operation, the return valve 34 is in an open position shown in FIG. 3, in which the return port 38 is aligned with the return passageway 42 to fluidly communicate the piston cylinder 26 and the reservoir. In the open position, the pressure in the piston cylinder 26 is at approximately zero pounds per square inch (psi), the speed of the motor 12 is at zero revolutions per minute (rpm), and the current supplied to the motor 12 is zero amperes (A or amps).

Figure 4:
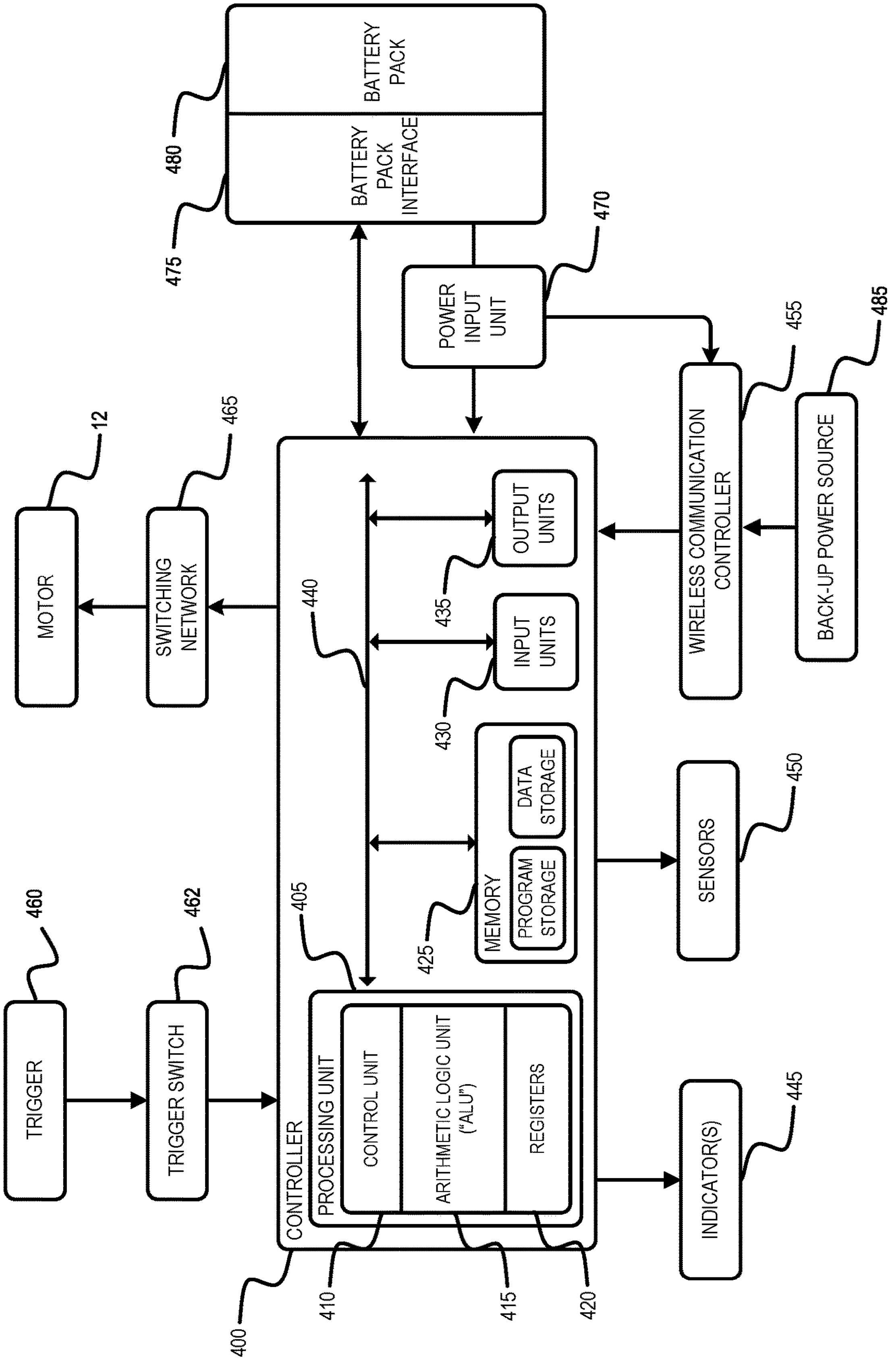
FIGS. 4 and 5 are block circuit diagrams of the power tool of FIG. 1A or FIG. 1B.

The pressure in the piston cylinder 26 may be sensed by a pressure sensor 68 and the signals from the pressure sensor 68 are sent to the electronic control and monitoring circuitry (see, e.g., controller 400 of FIG. 4). The pressure sensor 68 may be referred to as a pressure transducer, a pressure transmitter, a pressure sender, a pressure indicator, a piezometer and a manometer. The pressure sensor 68 is either an analog or digital pressure sensor. In some embodiments, the pressure sensor 68 is a force collector type of pressure sensor, such as piezoresistive strain gauge, capacitive, electromagnetic, piezoelectric, optical, and potentiometric. In some embodiments, the pressure sensor 68 is manufactured out of piezoelectric materials, such as quartz. In other embodiments, the pressure sensor 68 is a resonant, thermal, or ionization type of pressure sensor.

The speed of the motor 12 is sensed by a speed sensor that detects the position and movement of a rotor relative to stator and generates signals indicative of motor position, speed, and/or acceleration, which are provided to the electronic control and monitoring circuitry. In some embodiments, the speed sensor includes a Hall effect sensor to detect the position and movement of the rotor magnets.

The electric current flow through the motor 12 is sensed, for example, by a current sensor (e.g., an ammeter) and the output signals from the current sensor are sent to the electronic control and monitoring circuitry. Alternatively, the current flow through the motor 12 can be derived from voltage, using a voltage sensor (e.g., a voltmeter), taken across the resistance of the windings in the motor 12. Other methods can also be used to calculate the electric current flow through the motor 12 with other types of sensors. The hydraulic power tool can include other sensors to control and monitor other characteristics of the other movable components of the power tool 10, such as the motor 12, pump 14, or piston 30.

Figure 1B:
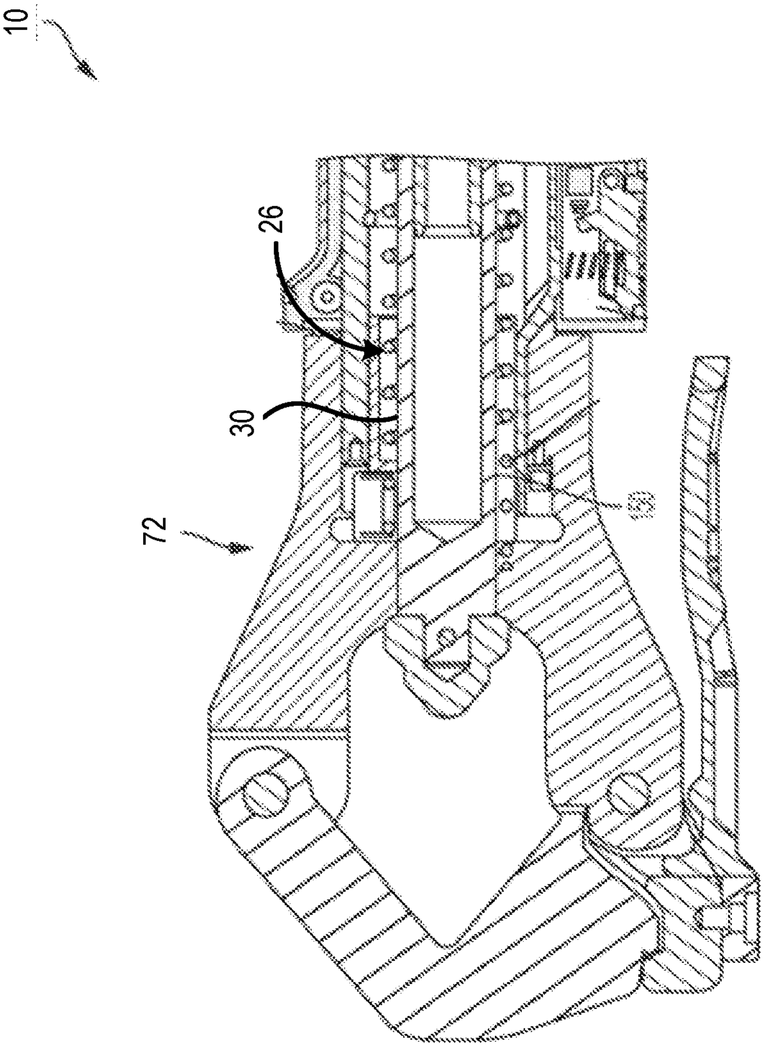

The position of the crimper head 72, such as the jaws 32 or the die, may be sensed by a position sensor 150, illustrated in FIG. 1B. The position sensor 150 is, for example, a displacement sensor, a distance sensor, a photodiode array, a potentiometer, a proximity sensor, a Hall sensor, or the like. In some embodiments, the piston 30 includes a plurality of conductive rings (e.g., copper rings) situated around the piston 30. When the power tool 10 operates, the piston 30 and the conductive rings move within the piston cylinder 26. In some embodiments, the position sensor 150, which may be a Hall sensor situated within or near the piston cylinder 26, detects the distance by detecting the conductive rings moving with the piston 30. The further the piston 30 extends, the greater the number of conductive rings and distance detected by the position sensor 150. Based on the movement of the piston 30 during an operation of the power tool 10, the position sensor 150 generates an output signal representative of a distance that the piston 30 has traveled from a particular reference point, such as a proximal position or a home position. The output signal may be communicated to a controller 400 of the power tool 10, illustrated in FIG. 4.

In some embodiments, the position sensor 150 also provides information regarding the direction of motion of the piston 30. For example, the position sensor 150 determines if the piston 30 is extending or retracting. In some embodiments, the position sensor 150 continuously senses the movement of the piston 30. In some embodiments, the position sensor 150 is only activated during a period of time the piston 30 is being driven.

The controller 400 for the power tool 10 is illustrated in FIG. 4. The controller 400 is electrically and/or communicatively connected to a variety of modules or components of the power tool 10. For example, the illustrated controller 400 is connected to indicators 445, sensors 450 (which may include, for example, the pressure sensor 68, the speed sensor, the current sensor, the voltage sensor, the position sensor 150, etc.), a wireless communication controller 455, a trigger 460, a trigger switch 462, a switching network 465, and a power input unit 470.

The controller 400 includes a plurality of electrical and electronic components that provide power, operational control, and protection to the components and modules within the controller 400 and/or power tool 10. For example, the controller 400 includes, among other things, a processing unit 405 (e.g., a microprocessor, an electronic processor, an electronic controller, a microcontroller, or another suitable programmable device), a memory 425, input units 430, and output units 435. The processing unit 405 includes, among other things, a control unit 410, an arithmetic logic unit ("ALU") 415, and a plurality of registers 420 (shown as a group of registers in FIG. 4), and is implemented using a known computer architecture (e.g., a modified Harvard architecture, a von Neumann architecture, etc.). The processing unit 405, the memory 425, the input units 430, and the output units 435, as well as the various modules connected to the controller 400 are connected by one or more control and/or data buses (e.g., common bus 440). The control and/or data buses are shown generally in FIG. 4 for illustrative purposes. The use of one or more control and/or data buses for the interconnection between and communication among the various modules and components would be known to a person skilled in the art in view of the embodiments described herein.

The memory 425 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 405 is connected to the memory 425 and executes software instruction that are capable of being stored in a RAM of the memory 425 (e.g., during execution), a ROM of the memory 425 (e.g., on a generally permanent basis), or another non-transitory computer readable medium such as another memory or a disc. Software included in the implementation of the power tool 10 can be stored in the memory 425 of the controller 400. The software includes, for example, firmware, one or more applications, program data, filters, rules, one or more program modules, and other executable instructions. The controller 400 is configured to retrieve from the memory 425 and execute, among other things, instructions related to the control processes and methods described herein. In other embodiments, the controller 400 includes additional, fewer, or different components.

In some embodiments, as described above, the power tool 10 is a crimper. The controller 400 drives the motor 12 to perform a crimp in response to a user's actuation of the trigger 460. Depression of the activation trigger 460 actuates a trigger switch 462, which outputs a signal to the controller 400 to actuate the crimp. The controller 400 controls a switching network 465 (e.g., a FET switching bridge) to drive the motor 12. When the trigger 460 is released, the trigger switch 462 no longer outputs the actuation signal (or outputs a released signal) to the controller 400. The controller 400 may cease a crimp action when the trigger 460 is released by controlling the switching network 465 to brake the motor 12.

The battery pack interface 475 is connected to the controller 400 and couples to a battery pack 480. The battery pack interface 475 includes a combination of mechanical (e.g., a battery pack receiving portion) and electrical components configured to and operable for interfacing (e.g., mechanically, electrically, and communicatively connecting) the power tool 10 with the battery pack 470. The battery pack interface 475 is coupled to the power input unit 470. The battery pack interface 475 transmits the power received from the battery pack 480 to the power input unit 470. The power input unit 470 includes active and/or passive components (e.g., voltage step-down controllers, voltage converters, rectifiers, filters, etc.) to regulate or control the power received through the battery pack interface 475 and to the wireless communication controller 455 and controller 400. When the battery pack 480 is not coupled to the power tool 10, the wireless communication controller 455 is configured to receive power from a back-up power source 485.

The indicators 445 are also coupled to the controller 400 and receive control signals from the controller 400 to turn on and off or otherwise convey information based on different states of the power tool 10. The indicators 445 include, for example, one or more light-emitting diodes (LEDs), or a display screen. The indicators 445 can be configured to display conditions of, or information associated with, the power tool 10. For example, the indicators 445 can display information relating to the success or failure of a crimping action performed by the power tool 10. In addition to or in place of visual indicators, the indicators 445 may also include a speaker or a tactile feedback mechanism to convey information to a user through audible or tactile outputs.

In some embodiments, the memory 425 includes die data, which specifies one or more of the type of die (e.g., the size and material of the die) attached to the body 1, the workpiece size, the workpiece shape, the workpiece material, the application type (e.g., electrical or plumbing), varieties of types of die compatible with the power tool 10, etc. The memory 425 can also include expected curve data, which is described in more detail below. In some embodiments, the die data is communicated to and stored in the memory 425 via an external device 605 (see FIG. 6). In some embodiments, the die data is stored in a look-up table in the memory 425. The memory 425 may further store information relating to the manufacturer of the power tool 10.

Figure 5:
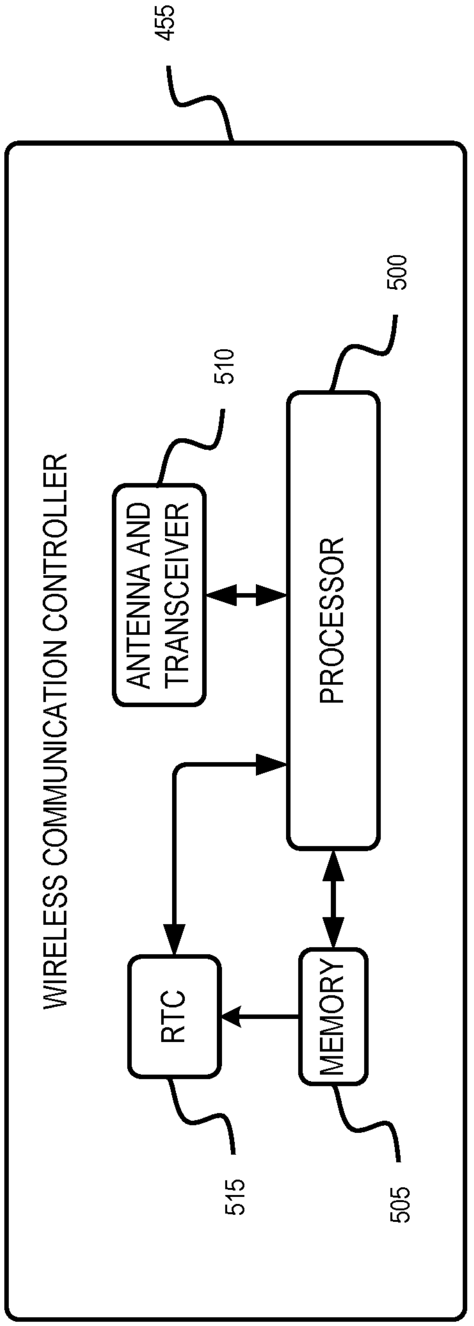

As shown in FIG. 5, the wireless communication controller 455 includes a processor 500, a memory 505, an antenna and transceiver 510, and a real-time clock (RTC) 515. The wireless communication controller 455 enables the power tool 10 to communicate with an external device 605 (see, e.g., FIG. 6). The radio antenna and transceiver 510 operate together to send and receive wireless messages to and from the external device 605 and the processor 500. The memory 505 can store instructions to be implemented by the processor 500 and/or may store data related to communications between the power tool 10 and the external device 605 or the like. The processor 500 for the wireless communication controller 455 controls wireless communications between the power tool 10 and the external device 605. For example, the processor 500 associated with the wireless communication controller 455 buffers incoming and/or outgoing data, communicates with the controller 400, and determines the communication protocol and/or settings to use in wireless communications. The communication via the wireless communication controller 455 can be encrypted to protect the data exchanged between the power tool 10 and the external device 605 from third parties.

In the illustrated embodiment, the wireless communication controller 455 is a Bluetooth® controller. The Bluetooth® controller communicates with the external device 605 employing the Bluetooth® protocol. Therefore, in the illustrated embodiment, the external device 605 and the power tool 10 are within a communication range (i.e., in proximity) of each other while they exchange data. In other embodiments, the wireless communication controller 455 communicates using other protocols (e.g., Wi-Fi, ZigBee, a proprietary protocol, etc.) over different types of wireless networks. For example, the wireless communication controller 455 may be configured to communicate via Wi-Fi through a wide area network such as the Internet or a local area network, or to communicate through a piconet (e.g., using infrared or NFC communications).

In some embodiments, the network is a cellular network, such as, for example, a Global System for Mobile Communications ("GSM") network, a General Packet Radio Service ("GPRS") network, a Code Division Multiple Access ("CDMA") network, an Evolution-Data Optimized ("EV-DO") network, an Enhanced Data Rates for GSM Evolution ("EDGE") network, a 3GSM network, a 4GSM network, a 4G LTE network, 5G New Radio, a Digital Enhanced Cordless Telecommunications ("DECT") network, a Digital AMPS ("IS-136/TDMA") network, or an Integrated Digital Enhanced Network ("iDEN") network, etc.

The wireless communication controller 455 is configured to receive data from the controller 400 and relay the information to the external device 605 via the antenna and transceiver 510. In a similar manner, the wireless communication controller 455 is configured to receive information (e.g., configuration and programming information) from the external device 605 via the antenna and transceiver 510 and relay the information to the controller 400.

The RTC 515 increments and keeps time independently of the other power tool components. The RTC 515 receives power from the battery pack 480 when the battery pack 480 is connected to the power tool 10 and receives power from the back-up power source 485 when the battery pack 480 is not connected to the power tool 10. Having the RTC 515 as an independently powered clock enables time stamping of operational data (stored in memory 505 for later export) and a security feature whereby a lockout time is set by a user (e.g., via the external device 605) and the tool is locked-out when the time of the RTC 515 exceeds the set lockout time.

Figure 6:
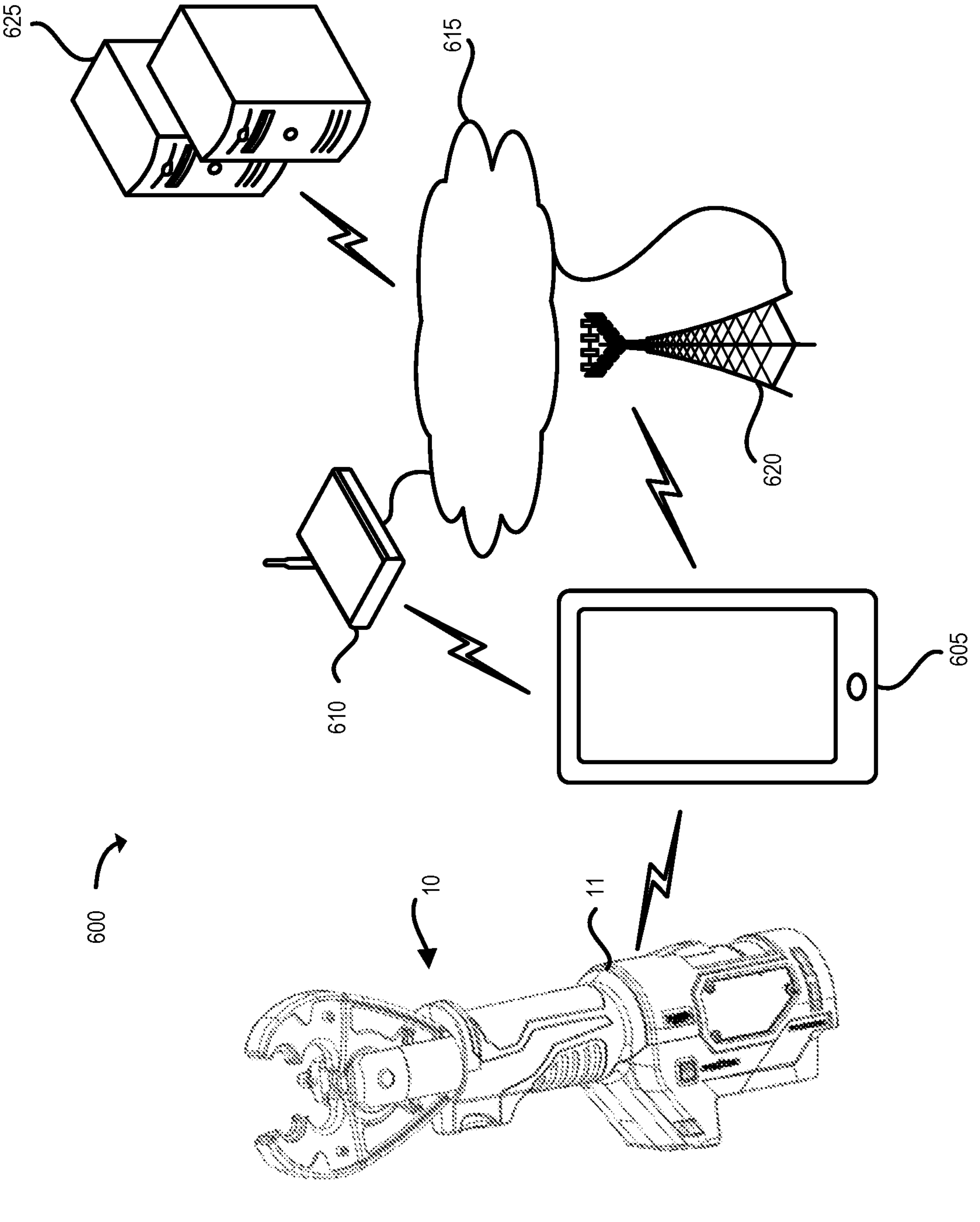
FIG. 6 is a communication system for the power tool of FIG. 1A or FIG. 1B and an external device in accordance with an embodiment described herein.

FIG. 6 illustrates a communication system 600. The communication system 600 includes at least one power tool 10 (illustrated as the crimper) and an external device 605. Each power tool device 10 (e.g., a crimper, a cutter, a battery powered impact driver, a power tool battery pack, and the like) and the external device 605 can communicate wirelessly while they are within a communication range of each other. Each power tool 10 may communicate power tool status, power tool operation statistics, power tool identification, power tool sensor data, stored power tool usage information, power tool maintenance data, and the like.

More specifically, the power tool 10 can monitor, log, and/or communicate various tool parameters that can be used for confirmation of correct tool performance, detection of a malfunctioning tool, and determination of a need or desire for service. Taking, for example, the crimper as the power tool 10, the various tool parameters detected, determined, and/or captured by the controller 400 and output to the external device 605 can include a crimping time (e.g., time it takes for the power tool 10 to perform a crimping action), a type of die received by the power tool 10, a time (e.g., a number of seconds) that the power tool 10 is on, a number of overloads (i.e., a number of times the tool 10 exceeded the pressure rating for the die, the jaws 32, and/or the tool 10), a total number of cycles performed by the tool, a number of cycles performed by the tool since a reset and/or since a last data export, a number of full pressure cycles (e.g., number of acceptable crimps performed by the tool 10), a number of remaining service cycles (i.e., a number of cycles before the tool 10 should be serviced, recalibrated, repaired, or replaced), a number of transmissions sent to the external device 605, a number of transmissions received from the external device 605, a number of errors generated in the transmissions sent to the external device 605, a number of errors generated in the transmissions received from the external device 605, a code violation resulting in a master control unit (MCU) reset, a short in the power circuitry (e.g., a metal-oxide-semiconductor field-effect transistor (MOSFET) short), a hot thermal overload condition (i.e., a prolonged electric current exceeding a full-loaded threshold that can lead to excessive heating and deterioration of the winding insulation until an electrical fault occurs), a cold thermal overload (i.e., a cyclic or in-rush electric current exceeding a zero load threshold that can also lead to excessive heating and deterioration of the winding insulation until an electrical fault occurs), a motor stall condition (i.e., a locked or non-moving rotor with an electrical current flowing through the windings), a bad Hall sensor, a non-maskable interrupt (NMI) hardware MCU Reset (e.g., of the controller 400), an over-discharge condition of the battery pack, an overcurrent condition of the battery pack, a battery dead condition at trigger pull, a tool FETing condition, gate drive refresh enabled indication, thermal and stall overload condition, a malfunctioning pressure sensor condition for the pressure sensor 68, trigger pulled at tool sleep condition, Hall sensor error occurrence condition for one of the Hall sensors, heat sink temperature histogram data, MOSFET junction temperature histogram data, peak current histogram data (from the current sensor), average current histogram data (from the current sensor), the number of Hall errors indication, etc.

Using the external device 605, a user can access the tool parameters obtained by the power tool 10. With the tool parameters (i.e., tool operational data), a user can determine how the power tool 10 has been used (e.g., number of crimps performed), whether maintenance is recommended or has been performed in the past, and identify malfunctioning components or other reasons for certain performance issues. The external device 605 can also transmit data to the power tool 10 for power tool configuration, firmware updates, or to send commands. The external device 605 also allows a user to set operational parameters, safety parameters, select usable dies, select tool modes, and the like for the power tool 10.

The external device 605 is, for example, a smart phone (as illustrated), a laptop computer, a tablet computer, a personal digital assistant (PDA), or another electronic device capable of communicating wirelessly with the power tool 10 and providing a user interface. The external device 605 provides the user interface and allows a user to access and interact with the power tool 10. The external device 605 can receive user inputs to determine operational parameters, enable or disable features, and the like. The user interface of the external device 605 provides an easy-to-use interface for the user to control and customize operation of the power tool 10. The external device 605, therefore, grants the user access to the tool operational data of the power tool 10, and provides a user interface such that the user can interact with the controller 400 of the power tool 10.

In addition, as shown in FIG. 6, the external device 605 can also share the tool operational data obtained from the power tool 10 with a remote server 625 connected through a network 615. The remote server 625 may be used to store the tool operational data obtained from the external device 605, provide additional functionality and services to the user, or a combination thereof. In some embodiments, storing the information on the remote server 625 allows a user to access the information from a plurality of different locations. In some embodiments, the remote server 625 collects information from various users regarding their power tool devices and provide statistics or statistical measures to the user based on information obtained from the different power tools. For example, the remote server 625 may provide statistics regarding the experienced efficiency of the power tool 10, typical usage of the power tool 10, and other relevant characteristics and/or measures of the power tool 10. The network 615 may include various networking elements (routers 610, hubs, switches, cellular towers 620, wired connections, wireless connections, etc.) for connecting to, for example, the Internet, a cellular data network, a local network, or a combination thereof as previously described. In some embodiments, the power tool 10 is configured to communicate directly with the server 625 through an additional wireless interface or with the same wireless interface that the power tool 10 uses to communicate with the external device 605.

Returning to FIG. 1A, when a crimping operation is initiated (e.g., by pressing a motor activation trigger 460 of the power tool 10), the input shaft 50 is driven by the motor 12 in a counter-clockwise direction, thereby rotating the valve actuator 46 counter-clockwise. In some embodiments, the electric current flow through the motor 12 initially increases with in rush current and then drops to a steady state current flow. As the valve actuator 46 rotates counter-clockwise, rotational or centrifugal forces cause the second set of pawls 56 to extend from the body 48 and the first set of pawls 52 to retract into the body 48. As the input shaft 50 continues to rotate, one of the pawls 56 engages the second radial projection 64, rotating the return valve 34 clockwise from the open position to a closed position in which the return port 38 is misaligned with the return passageway 42.

Each type of die (e.g., size and shape) for a particular power tool 10 along with the type of workpiece material (e.g., malleable metal) can have different piston cylinder pressure, motor speed, motor current, and other characteristics over the time the crimp is being performed (i.e., the crimper head 72 is closing and opening). These characteristics (e.g., piston cylinder pressure, motor speed, ram distance, or motor current) are used to monitor, analyze, and evaluate the activity of the power tool 10. For instance, monitored characteristics are compared with the expected characteristics of good crimps for a particular die and material to determine if the crimp is acceptable and if power tool 10 is operating properly. In some embodiments, the die (such as die 36) received by the power tool 10 includes a wireless identifier (for example, identifier 37 in FIG. 1A), such as an RFID or NFC tag, that corresponds to the type of die. The die received by the power tool 10 may include a physical, wired, or other type of identifier, such as a unique resistive pattern engraved on the die, an arrangement of pins or magnets that create a unique magnetic field, or other measurable physical characteristics. The controller 400 of the power tool 10 may receive the wireless identifier, and use the type of die when determining a successful or unsuccessful crimp. Additionally, the controller 400 may select a mode of operation based on the type of die.

Figure 7:
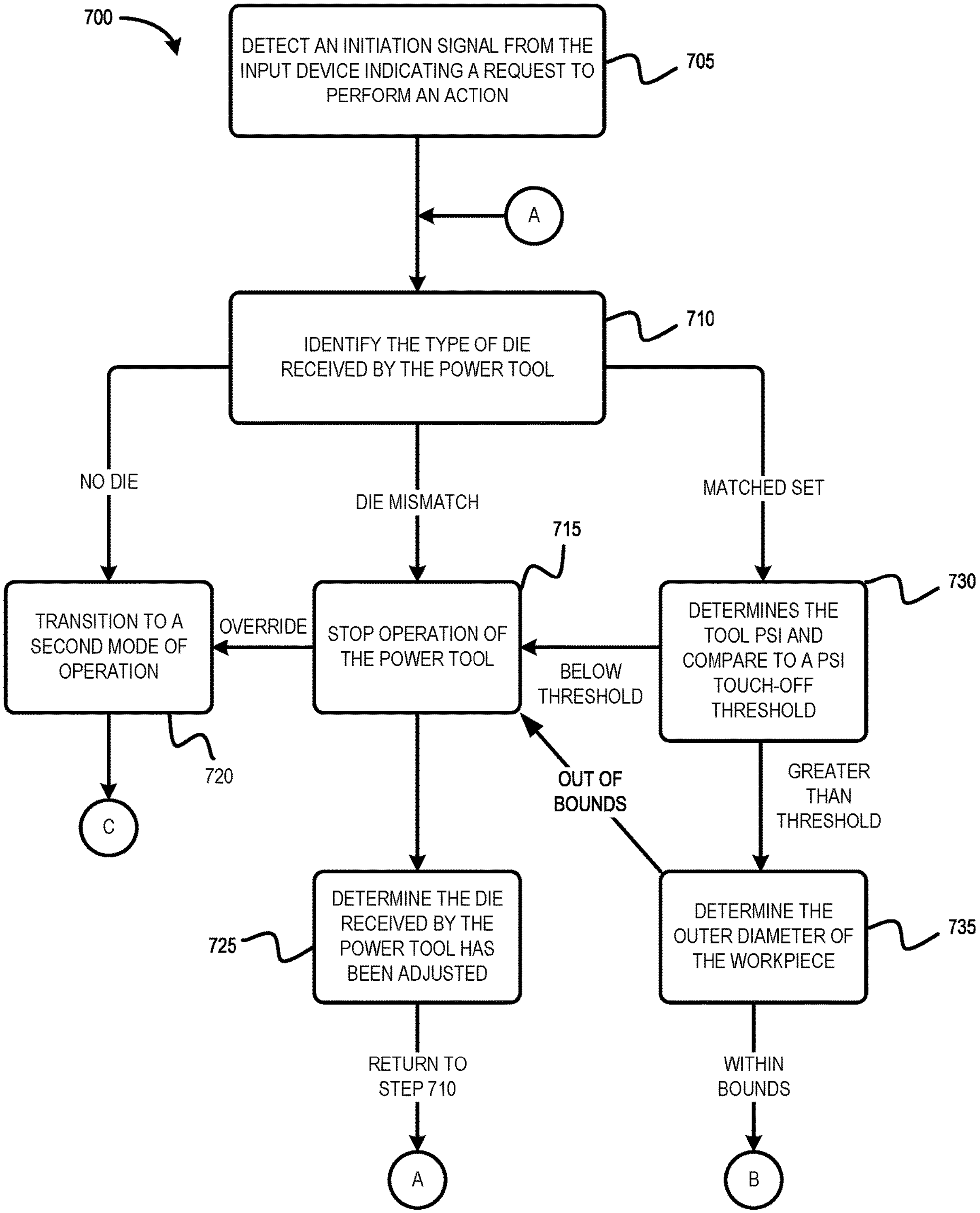
FIG. 7 illustrates a block diagram of a method performed by the controller of FIG. 4 in accordance with an embodiment described herein.

FIG. 7 illustrates a method 700 performed by the controller 400 for determining a mode of operation based on the type of die (or lack of die) installed in the power tool 10. The steps of the method 700 are shown for illustrative purposes. The controller 400 can perform one or more of the steps in an order different than that shown in FIG. 7, or one or more steps of the method 700 can be removed from the method 700.

At step 705, the controller 400 detects an initiation signal (e.g., a first signal) from an input device, such as the trigger 460, indicating a request to perform an action. In some embodiments, the action is a crimping action performed on an object (e.g., a connector). For example, depression of the trigger 460 actuates a trigger switch 462, which outputs a signal to the controller 400 to actuate the crimp. In some embodiments, the initiation signal is transmitted to the controller 400 by the external device 605.

At step 710, the controller 400 identifies a type of die received by the power tool 10. The type of die may indicate, for example, the die size and the die material. In some embodiments, the controller 400 receives a second signal from the wireless identifier of the die indicating the type of die. In some embodiments, the type of die is determined based on a color of the die, a pattern engraved into the die, or the like. In some embodiments, the die includes a magnet detected by a detector in the power tool 10, and the controller 400 determines the type of the die based on the magnetic flux detected by the detector.

In some embodiments, the type of die is identified by comparing the second signal to a look-up table. For example, the memory 425 or server 625 may store all die types compatible with the power tool 10. When the power tool 10 receives the die, such as a 250 MCM die, the die is compared to the table to determine if the die is compatible with the power tool 10. If the die type does not align with die information stored in the look-up table, a die mismatch occurs, and the controller 400 continues to step 715. In some embodiments, the second signal includes die manufacturer information. Should the die manufacturer information not align with the manufacturer information stored in the memory 425 or server 625, a die mismatch occurs, and the controller 400 continues to step 715. A die mismatch may also occur if an upper die and a lower die do not match. For example, the power tool 10 receives a 250 MCM upper die and a 300 MCM lower die. The controller 400 determines the upper die and the lower die are not compatible and continues to step 715.

At step 715, the controller 400 stops operation of the power tool 10. For example, if the initiation signal was a request to perform a crimping action, the crimping action is halted. In some embodiments, at step 725, the controller 400 determines the die received by the power tool 10 has been adjusted. For example, a user of the power tool 10 may adjust the die received by the power tool 10. Adjusting the die may strengthen the signal of the wireless identifier, allowing the controller 400 to more accurately determine the type of die. After the die has been adjusted, the controller 400 returns to step 710. In some embodiments, the controller 400 receives a signal indicating an override of the die mismatch. For example, a user of the power tool 10 may provide the override via an input unit 430, the external device 605, or the like. Upon receiving the override, the controller 400 continues to step 720 and transitions to a second mode of operation, such as a PSI-only mode of operation.

Returning to step 710, in some embodiments, the controller 400 determines no die is received by the power tool 10. When no die is received by the power tool 10, the controller 400 proceeds to step 715 and transitions to the second mode or method of operation for a dieless power tool shown in and described with respect to FIG. 10 (described below).

In some embodiments, the controller 400 determines the type of die received by the power tool 10 aligns with the die information stored in the look-up table. When the type of die matches, the controller 400 proceeds to step 730. At step 730, the controller 400, using the pressure sensor 68, determines the tool PSI and compares the tool PSI to a PSI touch-off threshold. The PSI touch-off threshold may be a minimum PSI needed for operation of the power tool 10. In some embodiments, the tool PSI is below the PSI touch-off threshold, and the controller 400 continues to step 715, where operation is halted. In some embodiments, when the tool PSI is below the PSI touch-off threshold, the controller 400 outputs an error indication with the indicators 445.

In some embodiments, the tool PSI is greater than or equal to the PSI touch-off threshold, and the controller 400 continues to step 735. At step 735, the controller 400 determines the outer diameter of the workpiece, such as a connector, and determines if the workpiece is compatible with the die received by the power tool 10. The outer diameter of the workpiece may be determined by detecting the position of the jaws 32. In some embodiments, the workpiece includes an identification tag, such as an RFID tag, indicating the size and material of the workpiece. The controller 400 analyzes the identification tag to determine at least the outer diameter of the workpiece. The controller 400 compares the outer diameter of the workpiece to outer diameters stored within the memory 425 or server 625. If the workpiece and the die are incompatible, the controller 400 returns to step 715. If the workpiece and the die are compatible, the controller 400 continues to step 805, shown in FIG. 8.

Figure 8:
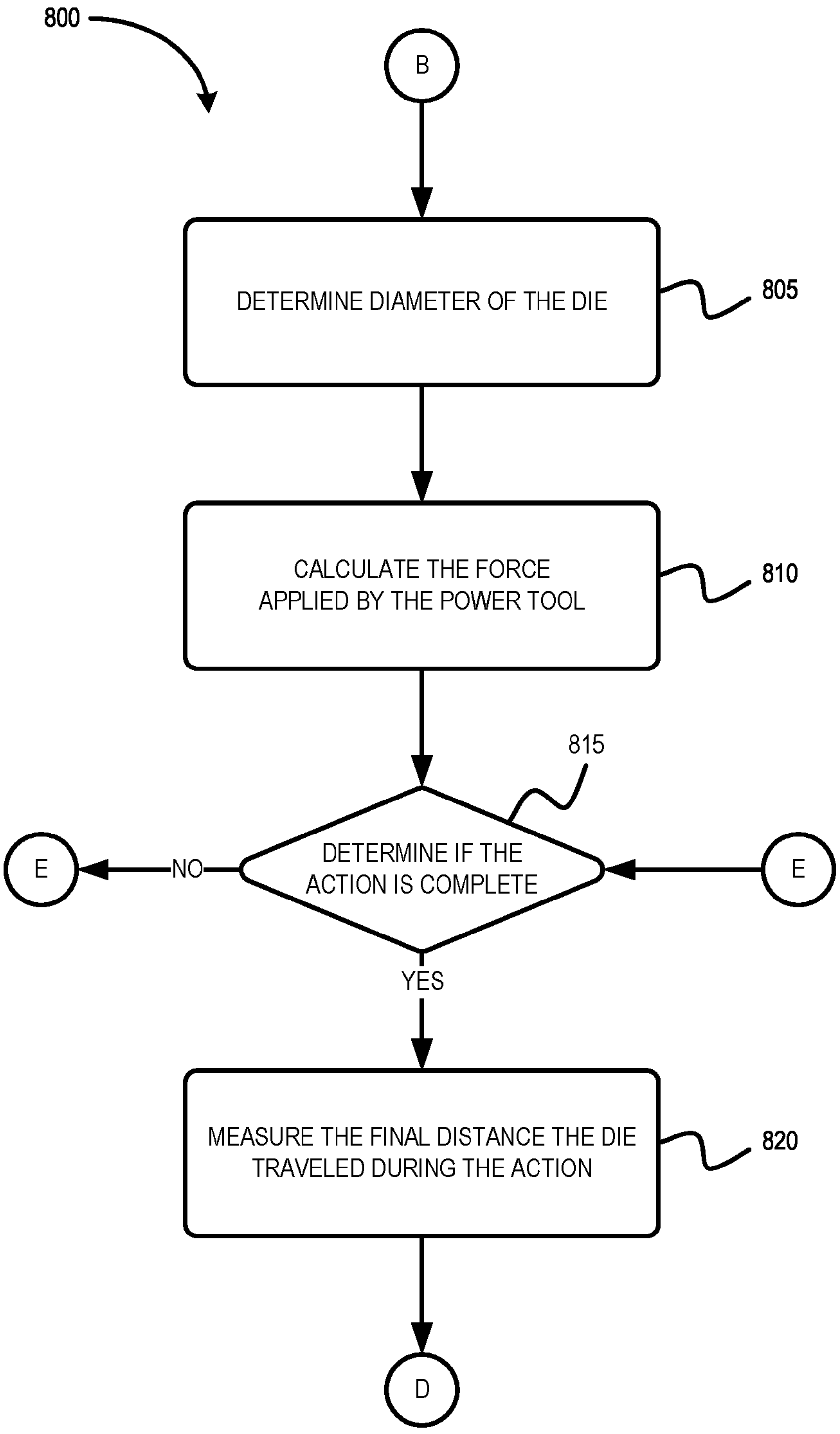
FIG. 8 illustrates a block diagram of a method performed by the controller of FIG. 4 in accordance with an embodiment described herein.

FIG. 8 illustrates a method 800 performed by the controller 400 while the power tool 10 performs the requested action. At step 805, the controller 400 determines the diameter of the die. The diameter of the die may be determined, for example, based on the wireless identifier, such as the RFID or NFC tag included with the die, a unique resistive pattern engraved on the die, a strength of a magnetic field from a magnet included in the die, or the like. If the diameter of the die is within a predetermined range (e.g., greater than a die diameter threshold), the controller 400 continues to step 810. If the diameter of the die is not within the predetermined range, the controller 400 can return to step 715 of FIG. 7.

At step 810, the controller 400 calculates the force applied by the power tool 10 to the workpiece. For example, the controller 400 may use the pressure as indicated by the pressure sensor 68 to determine the change in pressure as the action is performed by the power tool 10. In some embodiments, the force applied by the power tool 10 is stored in the memory 425.

At step 815, the controller 400 determines if the action is complete. For example, the controller 400 receives a signal from the pressure sensor 68, and determines the action is complete based on the pressure being above a pressure threshold. In some embodiments, the controller 400 determines the action is complete based on the diameter of the die and the distance the die travelled during the action. At step 820, after the action is complete, the controller 400 determines the final distance the die traveled during the action. For example, the controller 400 may use the output signal of the position sensor 150 to determine the final distance of the die. In some embodiments, the controller 400 continues to step 905 of FIG. 9. If the action is not complete, the controller 400 may return to step 805.

In some embodiments, the controller 400 determines or calculates the integral of the force (e.g., the force over distance) applied by the power tool 10 to the workpiece. For example, as the crimping action is performed, the controller 400 calculates the force applied (e.g., the pressure applied) by the power tool 10, as described above. If, at step 815, the action is not complete, the calculated force is stored in the memory 425. In some embodiments, the controller 400 determines the distance traveled by the die when the force is calculated. Each calculated force is associated with the determined distance to create a pressure curve indicative of the action performed by the power tool 10.

Figure 9:
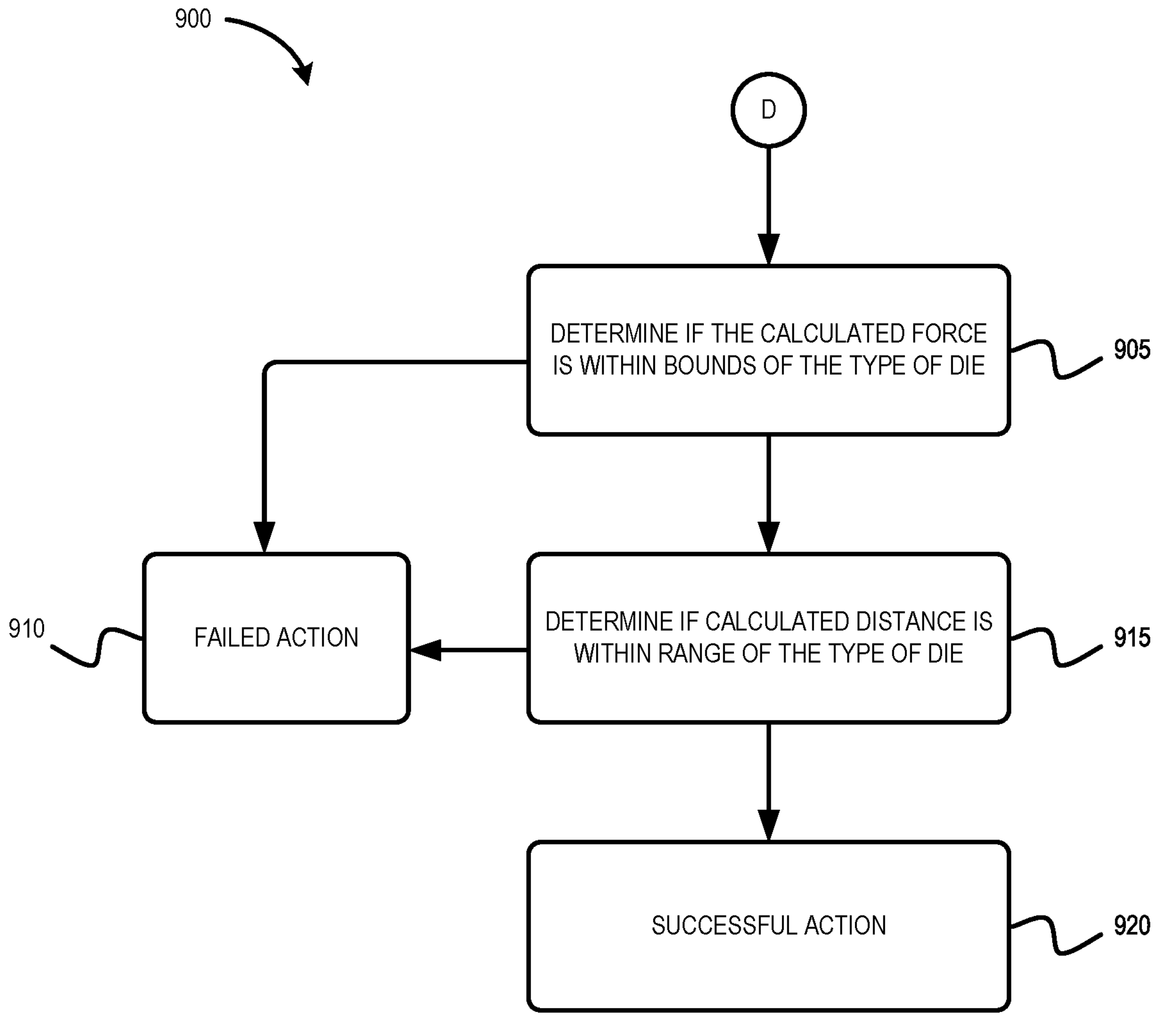
FIG. 9 illustrates a block diagram of a method performed by the controller of FIG. 4 in accordance with an embodiment described herein.

FIG. 9 illustrates a method 900 performed by the controller 400 to determine a status of the action performed by the power tool 10, such as a successful crimp or an unsuccessful crimp, based on the work performed during the action (e.g., a combination of force and distance). At step 905, the controller 400 determines if the calculated force is within bounds of the type of die. For example, the calculated force is compared to a force value associated with the type of die and stored within the look-up table. The controller 400 then determines if the calculated force is within a force threshold.

When the calculated force is not within the bounds of the type of die, and the controller 400 determines the action performed by the power tool 10 was a failure, as shown at step 910. For example, the controller 400 determines the crimping action was unsuccessful. The controller 400 may indicate the failure with the indicators 445, for example, using a red LED of the indicators 445 to indicate the failure.

When the calculated force is within the bounds of the type of die, and the controller 400 continues to step 915. At step 915, the controller 400 determines if the calculated distance is within bounds of the type of die. For example, the calculated distance is compared to a distance value associated with type of die and stored within the look-up table. The controller 400 then determines if the calculated distance is within a distance threshold.

When the calculated distance is not within the bounds of the type of die, and the controller 400 continues to step 910, as described above. When the calculated distance is within the bounds of the type of die, and the controller 400 continues to step 920. At step 920, the controller 400 determines the action performed by the power tool 10 was a success. For example, the controller 400 determines the crimping action was a success. The controller 400 may indicate the success with the indicators 445, for example, using a green LED of the indicators 445 to indicate the success.

Figure 10:
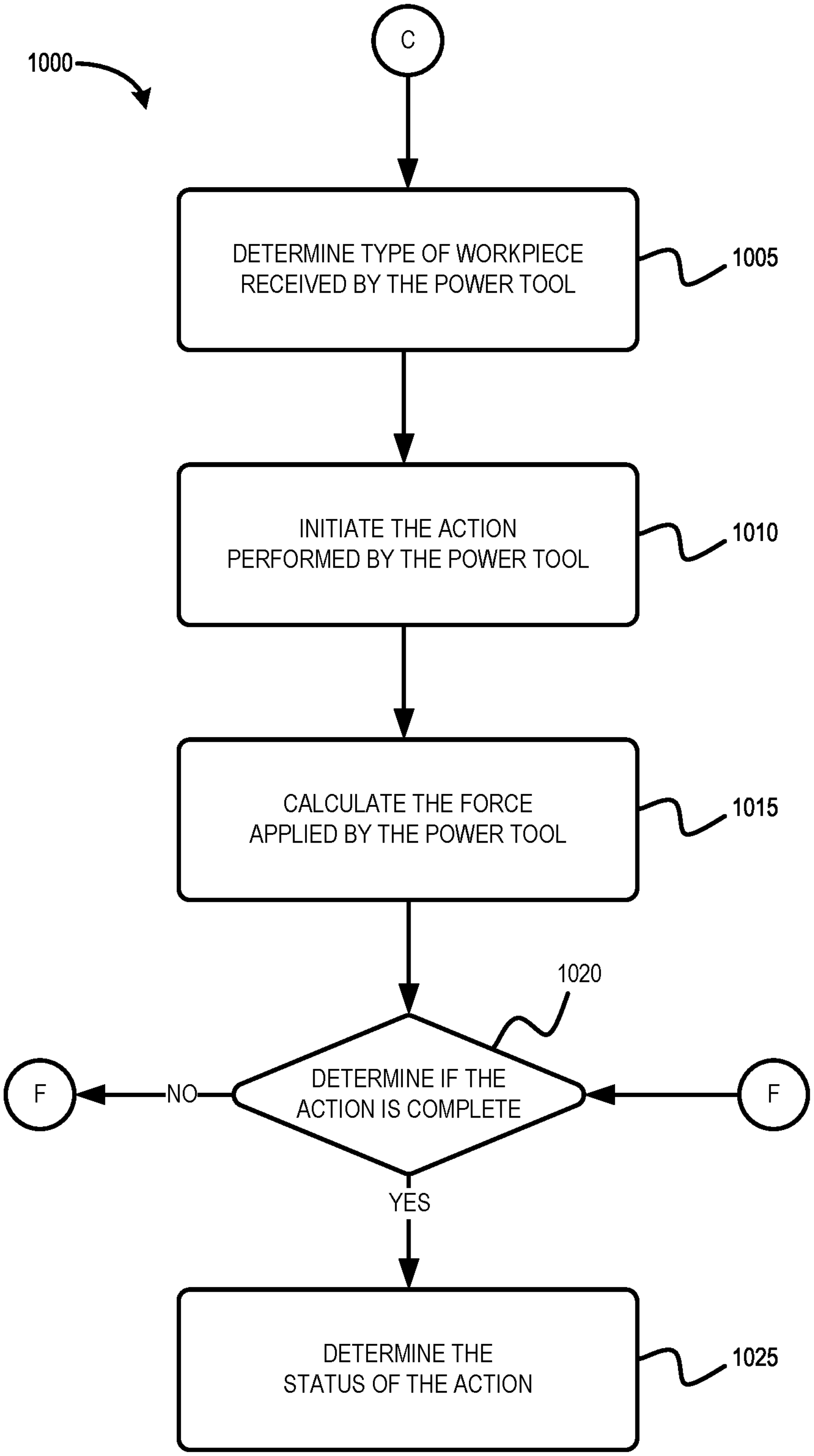
FIG. 10 illustrates a block diagram of a method performed by the controller of FIG. 4 in accordance with an embodiment described herein.

FIG. 10 illustrates a method 1000 performed by the controller 400 when the power tool 10 is a dieless crimper (e.g., based on the determination from method 700 at step 720). For example, at step 1005, the controller 400 determines the type of the workpiece received by the power tool 10, as described above. At step 1010, the controller 400 initiates the action performed by the power tool 10, such as a crimping action performed by a dieless crimp. At step 1015, the controller 400 calculates the force or pressure applied by the power tool 10 (e.g., hydraulic work), as described above. At step 1020, the controller 400 determines if the action is complete, as described above. At step 1025, the controller 400 determines the status of the action based on the calculated force or pressure.

In some embodiments, the controller 400 stores the status of the action (e.g., the success or the failure) in the memory 425 of the power tool 10 or a memory of the remote server 625. The stored statuses can be used for determining future statuses of actions. For example, the controller 400 may store previous pressure values and previous distance values indicative of a successful crimp. The controller 400 compares the determined pressure of the power tool 10 and the determined distance of the die to previous pressure values and distance values. If the values are the same, the controller 400 may determine the status of the action as a success. If the values are not the same, the controller 400 compares the determined pressure of the power tool 10 and the determined distance of the die to the look-up table, as described above.

In some embodiments, the controller 400 uses machine learning or an artificial intelligence model to determine the status of the action. For example, a machine learning model may be made available to the power tool 10 in the memory 425, the external device 605, the server 625, or the like. The model is provided with a series of pressure curves relating to how the pressure detected by pressure sensor 68 changes over the distance the die travels for a given die and workpiece combination. Once the model is trained or updated with these pressure curves, the pressure curves can be used to determine the status of the action with greater accuracy. For example, a detected pressure curve formed as the action is performed may be compared to previous pressure curves used to train the model. In some embodiments, the pressure curves stored by the memory 425 as the power tool 10 is used may be provided to the model as additional training. The updated pressure curves are stored in the memory 425, the external device 605, and/or the server 625 in order to be accessed and used to determine the status of a future action (e.g., crimp) by the power tool 10. In some embodiments, machine learning model is also used to identify and generate new pressure curves for new dies, or can learn or identify differences between material grades.

Thus, embodiments provided herein describe, among other things, systems and methods for determining a status of an action performed by a power tool.

What is claimed is:

1. A power tool comprising:

a power tool housing including a recess and an input device;

an accessory configured to be received by the recess, the accessory including an identifier; and an electronic processor connected to the input device, the electronic processor configured to:

receive a first signal from the identifier, determine an accessory type based on the first signal, receive a second signal from the input device indicating a request to perform an action on a workpiece, determine an outer diameter of the workpiece, determine, based on the outer diameter of the workpiece, whether the workpiece is compatible with the accessory type, initiate, when the workpiece is compatible with the accessory type, the action based on the second signal, calculate a force applied by the power tool to the workpiece, determine a distance traveled by the accessory during the action, and determine a status of the action based on the force applied to the workpiece and the distance traveled by the accessory.

2. The power tool of claim 1, wherein the accessory is a die.

3. The power tool of claim 1, wherein the accessory type is determined based on one selected from a group consisting of a color of the accessory, a pattern engraved into the accessory, a radio frequency identification tag of the accessory, and an near field communication tag of the accessory.

4. The power tool of claim 1, wherein the electronic processor is configured to:

determine whether the accessory type is compatible with the power tool by comparing the accessory type to a look-up table, and stop, in response to determining the accessory type is not compatible with the power tool, operation of the power tool.

5. The power tool of claim 4, wherein the electronic processor is configured to:

receive a signal indicating an override of the stop in operation of the power tool, and transition to a second mode of operation in response to the override, wherein the second mode of operation is a pounds per square inch ("PSI") only mode of operation.

6. The power tool of claim 1, further comprising a pressure sensor connected to the electronic processor, wherein the electronic processor is configured to:

calculate the force over distance applied by the power tool to the workpiece by determining a change in pressure as the action is performed.

7. The power tool of claim 1, wherein the status of the action is one selected from a group consisting of a successful crimp and an unsuccessful crimp.

8. The power tool of claim 1, wherein the electronic processor is further configured to output an indication of the status with an indicator of the power tool.

9. The power tool of claim 1, wherein the electronic processor includes a memory, and wherein the electronic processor is configured to:

compare the force applied to the workpiece to a previous force stored in the memory, compare the distance traveled by the accessory to a previous distance stored in the memory, and determine the status of the action based on whether the force and the previous force are the same, and whether the distance and the previous distance are the same.

* * * * *